United States Patent [19]
Kasselmann et al.

[11] B 3,915,507
[45] Oct. 28, 1975

[54] PRESSURE DIFFERENTIAL TRAILER BRAKING SYSTEM

[75] Inventors: John T. Kasselmann; James J. Colpaert; Richard T. Burnett, all of South Bend, Ind.

[73] Assignee: The Bendix Corporation, South Bend, Ind.

[22] Filed: Sept. 24, 1973

[21] Appl. No.: 400,310

[44] Published under the Trial Voluntary Protest Program on January 28, 1975 as document no. B 400,310.

[52] U.S. Cl. .................................. 303/7; 188/3 R
[51] Int. Cl.² ........................................ B60T 13/58
[58] Field of Search ........ 303/7, 2, 13, 22; 188/3 R, 188/3 H, 195; 91/415, 411 A, 165; 92/151; 200/82 D; 116/114 R, 118 R

[56] References Cited
UNITED STATES PATENTS

| | | |
|---|---|---|
| 2,336,342 | 12/1943 | Brewer, Jr. .............................. 303/7 |
| 3,135,358 | 6/1964 | Greentree ........................... 188/3 R |
| 3,507,542 | 4/1970 | Cannella ................................. 303/7 |
| 3,771,838 | 11/1973 | Rossigno et al. ......................... 303/7 |
| 3,788,709 | 1/1974 | Schwerin ............................ 188/3 R |

*Primary Examiner*—Trygve M. Blix
*Assistant Examiner*—D. C. Butler
*Attorney, Agent, or Firm*—Leo H. McCormick, Jr.; William N. Antonis

[57] ABSTRACT

A tow vehicle-trailer braking system wherein a first brake applying servomotor in the trailer is operated synchronously with a second brake applying servomotor in the tow vehicle through a control signal generated by sensing the operator input force applied to the brake pedal in the tow vehicle. The control signal, as derived from the sensed input force, can be modified to take into consideration change in weight in the trailer to provide optimum braking between the tow vehicle-trailer combination on any road surface.

14 Claims, 6 Drawing Figures

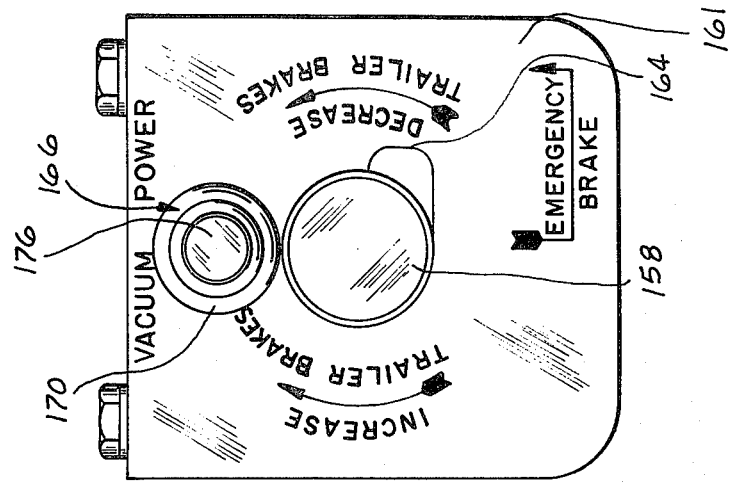
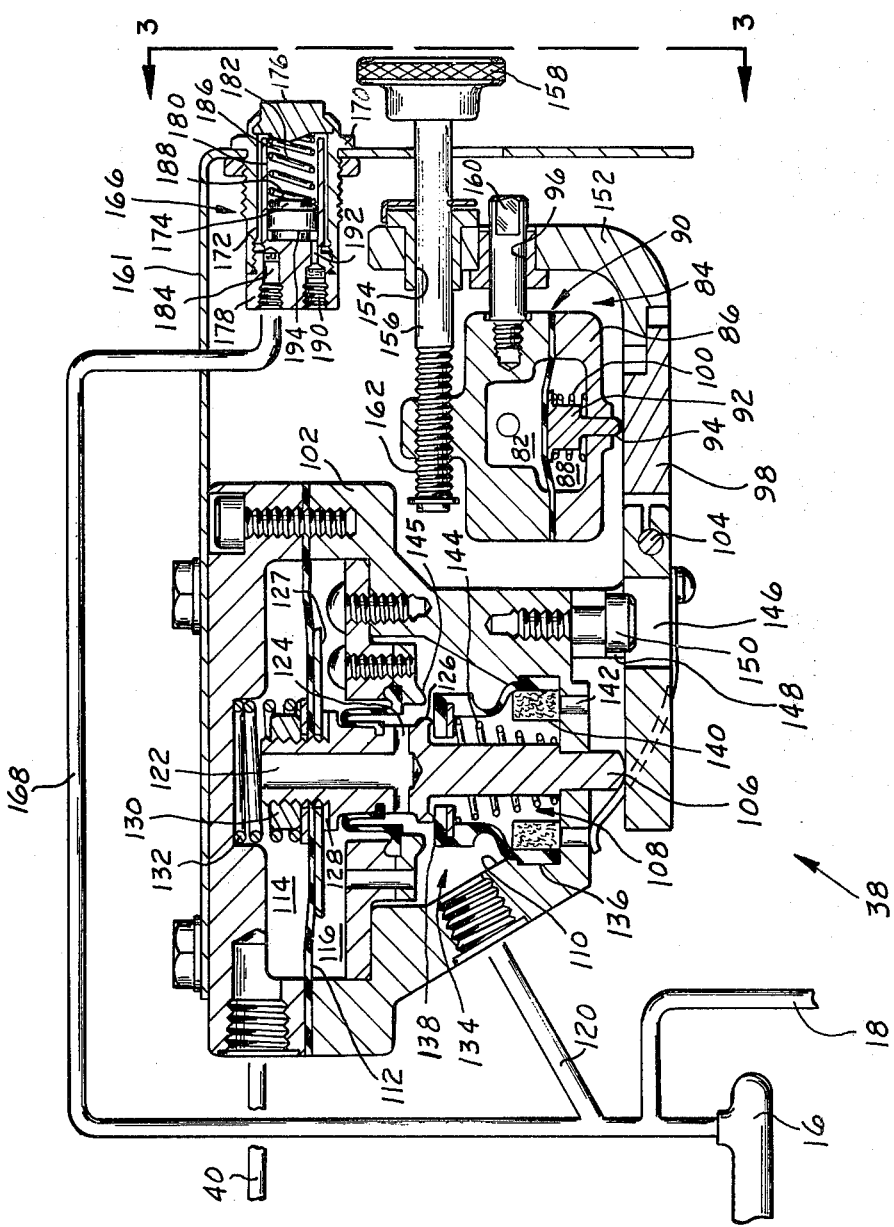

PRESSURE DIFFERENTIAL TRAILER BRAKING SYSTEM

BACKGROUND OF THE INVENTION

With an ever increasing number of people purchasing house trailers, recreational trailers and small cargo trailers which are moved by a tow vehicle over roads which can vary from interstate highways to trails in the wilderness, the ability to provide optimum braking between the tow vehicle-trailer combination and all road surfaces is a goal of the Department of Transportation as promulgated in the Motor Vehicle Safety Standards Act of 1973. Various types of braking systems such as pneumatic, electric, surge and pressure differential brakes have been proposed and used on trailers. An example of a surge brake system can be found in U.S. Application Ser. No. 228,936 and now U.S. Pat. No. 3,754,623, while a pressure differential brake system can be found in U.S. Application Ser. No. 267,294 and now U.S. Pat. No. 3,771,838, assigned to the same assignee of this application and incorporated herein by reference. In both of these systems, the braking force which develops in the trailer is directly dependent upon the hydraulic braking force supplied to the wheel brakes in the trailer. These, of course, are better systems than the usual pneumatic and electric braking systems wherein the operator separately and independently actuates the trailer brakes by hand. However, unless the operator has extremely good reflexes, the actuation of the brakes of the tow vehicle and the trailer will not be synchronous. When the brakes of the tow vehicle are actuated first, the trailer has a tendency to push the tow vehicle which could result in swaying, skidding, and possibly a jackknife condition on roads where the coefficient of friction is low or varying.

SUMMARY OF THE INVENTION

We have devised a tow vehicle-braking system wherein the actuation of the individual brakes are synchronized. A sensing means connected to the brake pedal will respond to an input force applied by an operator to develop an actuation signal for the operation of a servomotor in the trailer. The development of the actuation signal will begin immediately upon the operator supplying an input force to the brake pedal and be substantially operational by the time the input force overcomes the return spring in the brake pedal. The actuation force as measured in the sensing means is transferred by linkage to a valve means. The valve means in response to the actuation signal will generate a control signal which is relayed to a motor means attached to the servomotor in the trailer. The control signal will cause a wall means in the motor means to move a push rod which actuates the operational valve in the servomotor. With the operational valve actuated, a hydraulic pressure will energize the wheel brakes in the trailer.

It is therefore the object of this invention to provide a tow vehicle braking system with the means for producing optimum effectiveness on any road surface.

It is another object of this invention to provide a trailer braking system with an actuation signal derived from sensing the input force supplied to operate the braking system of a tow vehicle.

It is still a further object of this invention to provide a trailer braking system with a control signal, derived from sensing the input force applied to a brake pedal in the tow vehicle, for actuating a motor means which supplies a servomotor in the trailer with an operational input force.

It is still a further object of this invention to provide a braking system with means for actuating the trailer brakes synchronously with the actuation of the tow vehicle brakes through means of the same input force to thereby establish an optimum braking effectiveness with all types of road surfaces.

These and other objects will become apparent from reading this specification and viewing the drawings.

BRIEF DESCRIPTION OF THE DRAWINGS

FIG. 2 is a sectional view taken along line 2—2 of FIG. 1 showing a control means for supplying the servomotor with an input force.

FIG. 3 is a view taken along line 3—3 of FIG. 2 showing the display of the control means.

DETAILED DESCRIPTION OF THE PREFERRED EMBODIMENT

Figure 1:
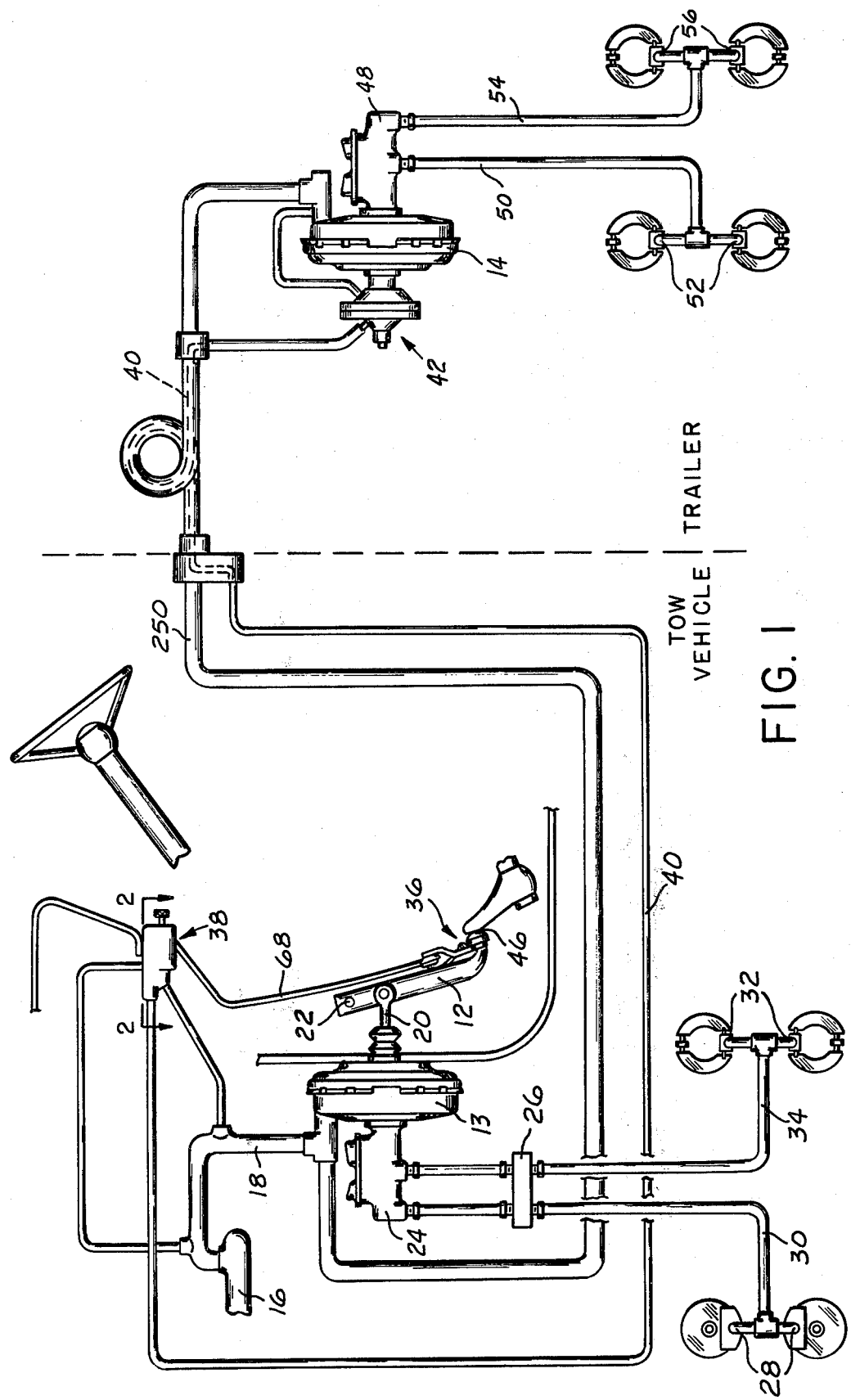
FIG. 1 is a schematic representation of a tow vehicle-trailer braking system.

A tow vehicle-trailer braking system is shown in FIG. 1 wherein an input force is applied to a brake pedal 12 by an operator to establish a force to operate the servomotor 13 in the tow vehicle and the servomotor 14 in the trailer. The servomotor 13 is connected to the intake manifold 16 through conduit 18. When the operator moves push rod 20, by rotating the brake pedal 12 about pin 22 in response to the input force, the control valve contained in the servomotor 13 will operate in a manner fully described in U.S. Pat. No. 3,106,873 which is incorporated herein by reference. The control valve upon moving will interrupt vacuum communication across the wall means in the servomotor 13 to establish a pressure differential force which will pressurize a hydraulic fluid in the master cylinder 24. This hydraulic fluid is transmitted through a pressure warning switch and proportioning valve 26, of a type disclosed in U.S. Pat. No. 3,734,246, before being communicated to the front wheel brakes 28 through conduit 30 and the rear wheel brakes 32 through conduit 34.

Before sufficient force is applied to brake pedal 12 to move push rod 20 and develop the pressure differential force in servomotor 13, sensing means 36 attached to the brake pedal 12 will begin to send an actuation signal to valve means 38. The valve means 38 will convert the actuation signal into a control signal which will be carried through line 40 to the motor means 42 attached to the servomotor 14 in the trailer. As the operator intensifies the operational input force on the foot pad 46 of the brake pedal 12, the actuation signal from the sensing means 36 will correspondingly be increased. Upon the push rod 20 moving, a corresponding actuation input force will be transmitted from the motor means 42 to the servomotor 14 from the valve means 38. This actuation input force will move a control valve means in the servomotor 14 to interrupt vacuum communication across a wall means 44 (see FIG. 4) contained therein, to develop a pressure differential. The pressure differential provides an actuation force which will energize the master cylinder 48. With the master cylinder 48 energized, pressurized hydraulic fluid is transmitted through conduits 50 and 54 to the wheel brakes 52 and 56 on the trailer. Thus, the wheel brakes in the trailer can be activated to provide an initial braking with the road surface in synchronization with the wheel brakes on the tow vehicle.

The various component parts of this system will now be explained in particular detail.

Figure 5:
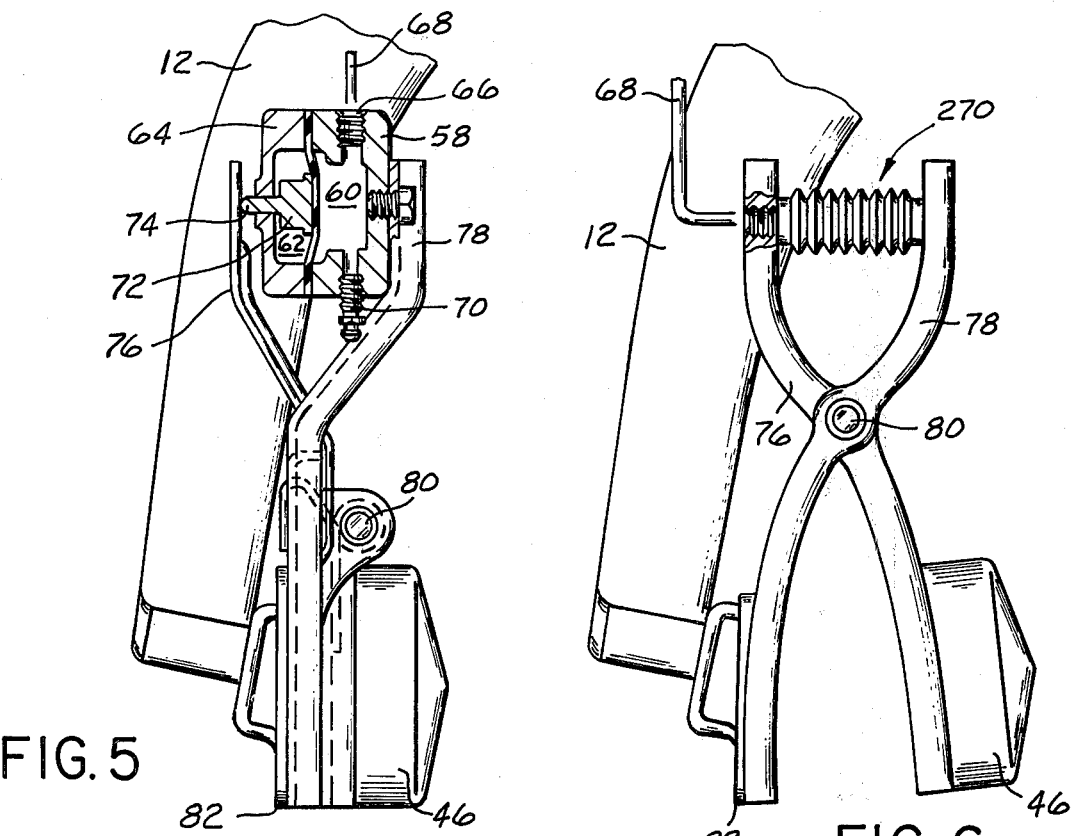
FIG. 5 is a sectional view of a force cell attached to the brake pedal in FIG. 1 wherein an actuation signal is generated to operate the control means in FIG. 2.

The sensing means 36, shown in FIG. 5 consists of a housing 58 having a closed chamber 60 separated from a reaction chamber 62 by a diaphragm 64. The closed chamber 60 has an opening 66 which is connected by conduit 68 to the valve means 38. The closed chamber is completely filled with a hydraulic fluid through the bleed screw 70. Movement of the piston 72 on the opposite side of the diaphragm 64 will act on the fluid to develop a hydraulic pressure to create the actuation signal which is communicated to the valve means 38. The housing 58 (see FIG. 5) is bolted to lever 78 which is attached to bracket 82 on the brake pedal 12. The piston 72 has a stem 74 which extends through the housing 58 and engages lever 76. The foot pad 46 is fixed to the end of the lever 76 while pin 80 joins levers 76 and 78 together at a fixed distance from the piston 72 and the pad 46. The input from the operator applied to the foot pad 46 causes the lever 76 to pivot around pin 80 and move piston 72 within the reaction chamber 62 to develop fluid pressure in the closed chamber 60. This input force from the operator is transmitted to the bracket 82 through lever 78 and the pin 80 causing the pedal 12 to rotate on pin 22 and move push rod 20. However, by this time the hydraulic fluid in the closed chamber 60 has already developed a corresponding hydraulic fluid pressure in the closed chamber 82 of the force cell means 84 located in the valve means 38 shown in FIG. 2.

The force cell means 84 consists of a housing 86 having a reaction chamber 88 separated from the closed chamber 82 by a diaphragm 90. The reaction chamber 88 retains a piston 92 which has a stem 94. Stem 94 extends through the housing 86 and engages a lever arm 98. A spring 100 located in the reaction chamber 88 acts on the piston 92 to oppose the hydraulic fluid under pressure communicated through conduit 68.

The lever 98 is pivotally attached to housing 102 by a bracket 146 through which a pin 104 is attached. The pin 104 will transmit an operational force to the stem 106 of the plunger means 108 located in bore 110 of the housing 102. The bore 110 is divided by a diaphragm 112 into a control chamber 114 and a vacuum chamber 116. The control chamber 114 is connected to the motor means 42 by the conduit 40 while the vacuum chamber 116 is connected to conduit 18 coming from the intake manifold 16 by conduit 120.

The stem 106 of the plunger means has a passage 122 with a cross bore 124. An annular seat 126 projects rearwardly from adjacent the cross bore 124. The diaphragm 112 has an inner periphery which is fixed against a plate 127 which rests against a shoulder 128 by a nut 130. A return spring 132 located in the control chamber 114 acts on the plate to urge the plunger means 108 away from the control chamber 114.

A poppet means 134 which is located in bore 110 has a rib 136 which surrounds the stem 106 adjacent the annular rearward projection 126. The return spring 132 will urge the projection 126 against the face 138 to segregate the vacuum chamber 116 from the atmosphere which can freely enter bore 110 through filter 140 by way of holes 142. A spring 144 located in bore 110 will act on the back side of face 138 to assist in seating the annular projection 126 on face 138.

The bracket 146 has a leg 152 which is held in a substantially parallel relationship with the plunger means 108 when a bolt 150 which extends through opening 148 is brought snug against the housing 102. The leg 152 has a first opening 154 through which shaft 156 of the adjustment knob 158 extends to engage the housing 86 of the force cell means 84. The leg 152 has a second opening 96 through which a guide 160 extends therethrough to engage the housing 86. A lead screw 162 on the shaft 156 can move the housing 86 in a horizontal direction to change the location of the projection 94 from which the actuation force is transmitted to the lever 98. This will permit compensation for changes in the weight of the trailer load and permit use with trailers of varying weight and size. A slotted opening 164 in the shroud 161 surrounding the housing 102 will permit an operator to move knob 158 into a lock position (see FIG. 3). In the lock position, a horizontal force will be transmitted through the housing 86 to the lever 98 to override or augment the actuation force from the closed hydraulic chamber 82. The horizontal force will be sufficient enough to pivot the lever 98 on pin 104 and move the plunger means 108 to create an operational signal in the control chamber 114.

An indicator means 166 attached to shroud 161 is connected to the vacuum supply conduit 120 by a conduit 168 to inform an operator of the ability to develop an operational signal. The indicator means 166 has a housing 170 with a bore 172 therein. A lens 176 seals one end of bore 172 while an end cap 178 seals the other end. The end cap has a sleeve 180 which is concentric to the bore 172 and extends to adjacent the lens 176. A piston 174 is located within the sleeve 180. The piston 174 is held away from the lens 176 by a spring 182. The end cap 178 has a first opening 184 which is connected to the conduit 168 in communication with the vacuum supply and the area 186 adjacent the face 188 on the piston 174 and a second opening 190 which is in communication with the atmosphere and the area 192 adjacent the rear 194 of the piston 174. Upon vacuum being communicated through conduit 168, air present in area 186 will be evacuated to create a pressure differential across the piston 172 with air at atmospheric pressure present at the rear 194 of piston 174. When this pressure differential is sufficient to overcome spring 182, the piston 174 will move toward lens 176. The face 188 is coated with a colored light reflective paint and upon approaching lens 176 will appear to be illuminated. Thus, the operator will be alerted that the trailer brakes can be applied in response to an operator input.

Figure 4:
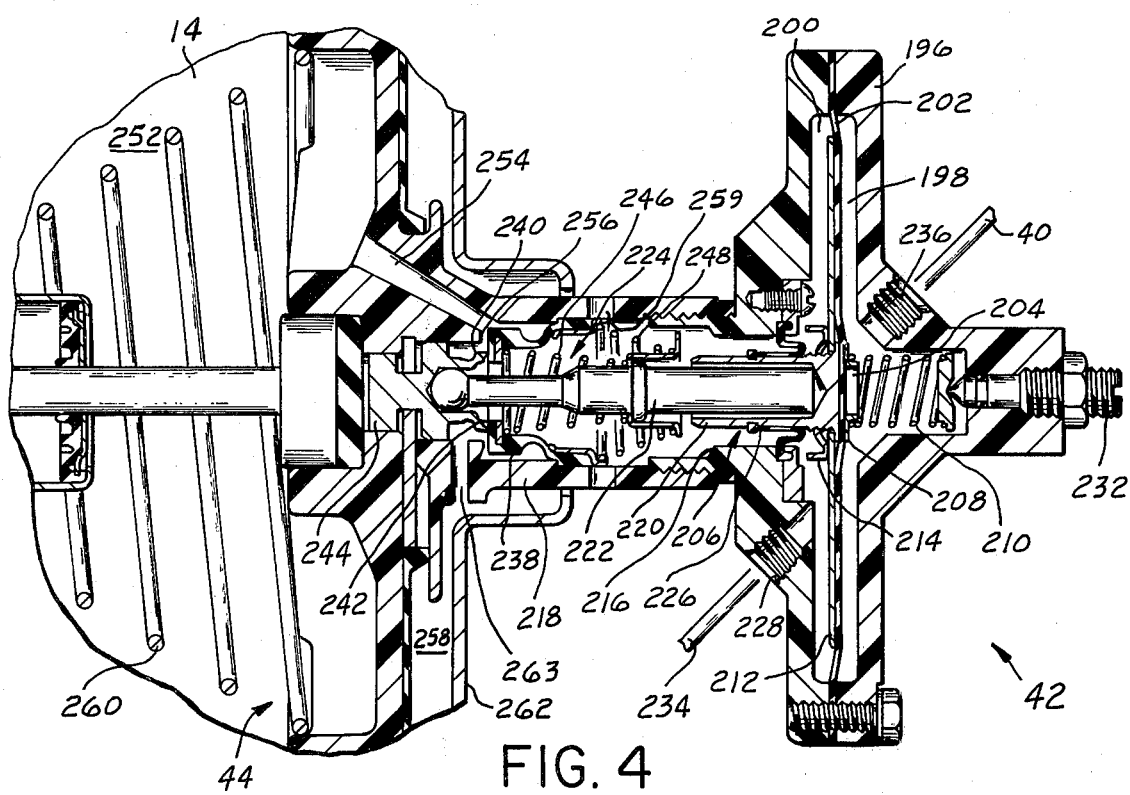
FIG. 4 is a sectional view of a motor means for operating the servomotor in the trailer.

The motor means 42, as shown in FIG. 4, has a housing 196 which has an interior cavity divided by a diaphragm 202 into a control chamber 198 and a vacuum chamber 200. The diaphragm 202 has an axial opening through which a rearward projection 204 on the hub means 206 extends. A disc 208 surrounds the projection 204. A spring 210 abuts the disc 208 and holds the diaphragm 202 against a backing plate 212. The backing plate 212 is positioned on the hub means 206 by a threaded ring 214. The housing has an axial bore 216 which is a concentric extension of the valve control housing 218 located in the first servomotor 14. The hub means 206 has a cylindrical projection 220 which surrounds the push rod 222 of the plunger valve control means 224 of the servomotor 14. A seal 226 attached to the hub means 206 and the housing 196 will prevent vacuum communicated through port 228 in conduit 234 from drawing air present in the control chamber 234 into the vacuum chamber 200. An adjustable cap 232 will act on spring 210 to position the hub means 206 within the housing 196 to size the vacuum chamber 200 and control chamber 198 to provide an adequate response from the operational signal communicated through opening 236 from conduit 40 from the control chamber 114 in the valve means 38.

The plunger valve control means 224 includes a poppet means 238 having a face 240 which is urged against the atmospheric seat 242 on the plunger 244 by spring 246 acting on the poppet and spring 248 acting on the push rod 222. In the position shown in FIG. 4, vacuum from the manifold 16 is communicated through conduit 250 to evacuate air from the front chamber 252 of the servomotor 14. This vacuum is communicated through passage 254 around vacuum seat 256 and into the rear chamber 258. This will allow the return spring 260 to hold wall means 44 against the rear shell 262 in a ready position to respond to the operational force applied to the push rod 222 by the motor means 42.

PREFERRED MODE OF OPERATION OF THE SYSTEM

When the operator desires to stop the tow vehicle-trailer combination, an input force is applied to foot pad 46. This input force will squeeze the scissors-like levers 76 and 78 to initially apply a force on projection 74 of the force cell in the sensing means 36. Since chamber 60 is a closed chamber filled with hydraulic fluid, the same force expended in moving piston 72 will expand chamber 82 and move piston 92. Movement of piston 92 will cause lever 98 to pivot on pin 104 and exert an actuation force on stem 106. This actuation force will cause stem 106 to move and allow spring 144 to urge face 138 against vacuum seat 145. Further movement of stem 106 will move the annular projection 126 away from the face 138 and allow air to enter the control chamber through the cross bore 124 and passage 122. This air under pressure will modify the effect of vacuum in chamber 118 to provide an operational signal for the motor means 42. When sufficient air has entered the control chamber 114 and has been communicated through conduit 40 to the control chamber 198, a pressure differential will develop across the diaphragm 202. The pressure differential will act on the backing plate 212 to move hub means 206. The hub means 206 upon moving will overcome return spring 248 to move face 240 of the poppet 238 against the vacuum seat 256. The above operation will coincide with the brake pedal moving push rod 20 to interrupt vacuum communication between the front chamber and rear chamber in servomotor 12. As additional force is applied to the foot pad 46, the actuation signal derived from the sensing means 36 will be converted into an operational signal in the valve means 38, to intensify the actuation force created by the motor means 42. Further movement of the push rod 222 will move the atmospheric seat 242 on the plunger 244 away from the poppet 238 to allow air to enter into the rear chamber 258 through holes 259 and develop a braking pressure differential across wall means 44. This braking pressure differential will move the wall means 44 to pressurize hydraulic fluid in master cylinder 48 and provide the trailer with braking. The communication of air into the rear chamber of servomotor 12 will occur simultaneously with the communication of air through passage 262 into the rear chamber 258 of servomotor 14.

Figure 6:
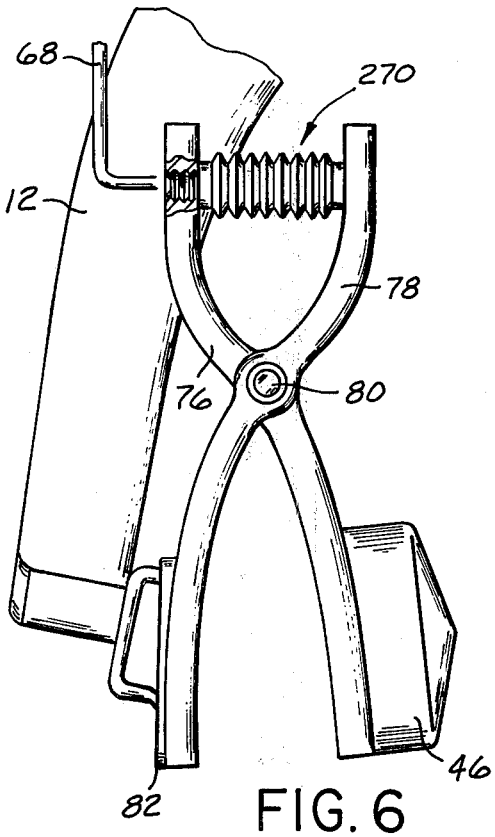
FIG. 6 is a sectional view of another force cell for producing the actuation signal at the brake pedal.

In the embodiment shown in FIG. 6, a bellows type sensor means 270 is utilized as the force cell to measure and respond to the input force applied to the foot pad 46. The output from the bellows will expand a similar bellows in the valve means 38 to provide the lever 98 with an operational signal to move the plunger means 108.

Through this tow vehicle-trailer braking system the actuation of servomotor 12 and servomotor 44 can be synchronized while taking into consideration the weight of the trailer to provide optimum braking between the road surface and the wheel brakes.

We claim:

1. In a tow vehicle-trailer braking system having a first brake applying servomotor operatively connected to the trailer brakes and a second brake applying servomotor operatively connected to the tow vehicle brakes, means responsive to the operator input force applied to the vehicle brake pedal for synchronously actuating said first brake applying servomotor upon actuation of said second brake applying servomotor by the force applied to said brake pedal, said means comprising:

sensing means having a first cell means having a first closed chamber therein, said first closed chamber being filled with a fluid, said first closed chamber having a first opening therein;

first piston means located in said closed chamber through which said input force is applied to the brake pedal, said piston means moving in response to the input force to proportionally compress said fluid causing a quantity thereof to flow through said first opening and establish an actuation signal indicative of said input force;

means responsive to said actuation signal for generating a control signal; and motor means responsive to said control signal for supplying said first servomotor with an actuation input force to thereby provide optimum braking effectiveness between the tow vehicle trailer and any surface.

2. In a tow vehicle-trailer braking system, as recited in claim 1 wherein said sensing means includes:

second cell means having a second closed chamber therein, said second closed chamber being filled with a fluid, said second closed chamber having a second opening which is connected to said first opening for providing communication therebetween; and second piston means located in said second closed chamber, said second piston means being moved upon fluid flowing between the first closed chamber and the second closed chamber, said second piston means upon moving establishing said control signal.

3. In the tow vehicle-trailer braking system, as recited in claim 2, wherein said sensing means further includes:

a housing having a bore therein, said bore being connected to said motor means; and plunger means located in said bore connected to said second piston means for regulating the communication between a source of vacuum and said motor means in response to said control signal.

4. In the tow vehicle-trailer braking system, as recited in claim 3, wherein said sensing means further includes:

linkage means for transferring said control signal from the second piston means to the plunger means.

5. In the tow vehicle-trailer braking system, as recited in claim 4, wherein said sensing means further includes:

diaphragm means having an external peripheral edge secured to said housing for dividing the interior of said bore into a first control chamber and a first vacuum chamber and an internal peripheral edge centrally located in said bore to permit said plunger means to interrupt the free communication of vacuum to the first control chamber and the first vacuum chamber.

6. In the tow vehicle-trailer braking system, as recited in claim 5, wherein said plunger means includes:

stem means having a first end which extends into the first control chamber through the internal periphery in the diaphragm means and a second end connected to said linkage means, said stem means having a passage which connects the first control chamber with the first vacuum chamber, said stem means having an annular rib extending rearwardly from said passage; and poppet means located in said bore and secured to said housing having a resilient face adapted to engage said annular rib on the stem means in a first position and to engage the seat in the housing when the stem means is in a second position to segregate the first vacuum chamber from the atmosphere, said stem means in the first position allowing vacuum from said source to evacuate air from the first control chamber through said passage therein and in the second position allowing air to enter said control chamber through said passage to develop said control signal.

7. In the tow vehicle-trailer braking system, as recited in claim 6, wherein said motor means includes:

a housing having a cavity therein with an axial bore extending therethrough;

wall means located in said housing for dividing said cavity into a second control chamber and a second vacuum chamber being connected to said source of vacuum, said second control chamber being connected to said first control chamber of the valve means, said control signal causing said wall means to move and transmit said actuation input force to said first servomotor.

8. In the tow vehicle-trailer braking system, as recited in claim 7, wherein said wall means includes:

hub means located in said axial bore having a concentric blind bore adjacent a shoulder on the periphery thereof;

plate means surrounding said hub means and abutting said shoulder thereon;

diaphragm means secured to said housing having an inner bead located in a groove on the exterior of the hub means, said inner bead holding said plate means against the shoulder; and push rod means having a first end retained in said blind bore in the hub means and a second end connected to a plunger valve means in said first servomotor.

9. In the tow vehicle-trailer braking system, as recited in claim 8, wherein said motor means further includes:

adjustment means located in said housing for positioning the hub means within said cavity to size the power chamber with respect to the control chamber.

10. In the tow vehicle-trailer braking system, as recited in claim 9, wherein said sensing means further includes:

hand positioning means connected to said second cell for changing the relationship between the control signal and the linkage means with a variation in the weight of the trailer.

11. In the tow vehicle-trailer braking system, as recited in claim 10, wherein said sensing means further includes:

indicator means for informing an operator of a generatable control signal for operating the motor means.

12. In the tow vehicle-trailer braking system, as recited in claim 11, wherein said indicator means includes:

piston means located in an indicator bore, said indicator bore being connected to said vacuum chamber in the housing of said valve means, said piston means moving in said indicator bore in response to vacuum being communicated thereto; and lens means located adjacent said indicator bore for modifying the reflection of light falling on the end of said piston to inform the operator of communication of vacuum to the valve means.

13. In the tow vehicle-trailer braking system, as recited in claim 9, wherein said sensing means includes:

hand control means for overriding the actuation signal to reinforce and modify the resulting control signal.

14. In the tow vehicle-trailer braking system, as recited in claim 13, wherein said hand control means includes:

locking means for maintaining a control signal in the absence of an actuation signal to independently operate the first servomotor.

* * * * *